(12) United States Patent
Liao

(10) Patent No.: US 6,763,111 B2
(45) Date of Patent: Jul. 13, 2004

(54) PORTABLE DEVICE FOR COILING CABLE AND AMPLIFYING SOUND

(76) Inventor: Sheng Hsin Liao, No. 10, Alley 38, Lane 229, San Chun St., Shulin, Taipei Hsien (TW)

( * ) Notice: Subject to any disclaimer, the term of this patent is extended or adjusted under 35 U.S.C. 154(b) by 438 days.

(21) Appl. No.: 09/988,425
(22) Filed: Nov. 20, 2001
(65) Prior Publication Data US 2003/0095658 A1 May 22, 2003

(51) Int. Cl.[7] ............................................... H04M 1/00
(52) U.S. Cl. ....................................... 379/446; 379/430
(58) Field of Search .......................... 379/420.04, 430, 379/446, 454, 455, 438; 455/575.2

(56) References Cited

U.S. PATENT DOCUMENTS 6,542,757 B2 * 4/2003 Bae ............................ 379/430

* cited by examiner

Primary Examiner—Jack Chiang
(74) Attorney, Agent, or Firm—Rosenberg, Klein & Lee

(57) ABSTRACT

A portable device for coiling cable and amplifying sound, the device comprises a cover body and an amplifier with a coiled cable, wherein an accommodating space is formed in an inner portion of the cover body, and the accommodating pace partitioned into a first space and a second space by an isolating device. A fixing member is disposed on an outer side of the cover body. The portable device for coiling cable and amplifying sound includes a casing, a cable coiling mechanism, a communication cable, an earphone, a circuit unit, and a connector, wherein the communication cable is coiled around the cable coiling mechanism, and the earphone and the circuit unit connected to the communication cable. The circuit unit has an amplifying element, and the connector connected to the circuit unit by a connecting wire. And the amplifier with a coiled cable is accommodated to the second space of the cover body.

14 Claims, 10 Drawing Sheets

PORTABLE DEVICE FOR COILING CABLE AND AMPLIFYING SOUND

BACKGROUND OF THE INVENTION

1. Field of the Invention

The present invention relates to a portable device for coiling cable and amplifying sound, more particularly to a portable amplifier with a coiled cable that connects to a mobile phone such that the earphone and the communication cable can be flexibly pulled out from or coiled into the amplifier.

2. Description of the Prior Art

At present, when a communication equipment regardless computer, modem, telephone, or fax machine etc. is used, it is unavoidable to have a proper communication cable for attaining the purpose of connection for communications. However, in order to avoid using a too long communication cable that may tangle together or a too short communication cable that does not fit the actual need. The structure of most of these cable coilers basically comprises a casing, rotary disk, a spiral coiling spring, and a communication cable, wherein the rotary disk and the spiral coiling spring are coupled such that the communication cable coiled around the rotary disk has the elasticity to coil the cable and resume it back to the original position.

In addition, after the communication cable is pulled out from a traditional cable coiler, the cable may be under tension due to the strong elastic pull by the spiral spring, and no longer can keep the appropriate length. Therefore, it creates a problem to the user. These cable coilers mainly use an elastic swinging plate, an opening on the periphery of the rotary disk, and a latch groove to produce the coiling and fixing functions.

However, as the information technology advances day after day, people get to have more chances to access mobile phones. At present, the prior-art cable coiler is not directly applicable for connecting the communication cable of the mobile phone and the earphone. Therefore the prior-art communication cable for the mobile phone and the earphone has specific lengths, and has the problems of too long or too many cables being tangled together, or too short that does not meet the practical needs.

Furthermore, the current prior-art mobile phones do not have the function of the amplifier, therefore when the user is using it, the user must attach the mobile phone closely to his/her ear or use an earphone to transmit the voice from the receiver of the mobile phone to the user's ear.

SUMMARY OF THE INVENTION

The primary objective of the present invention is to provide a portable device for coiling cable and amplifying sound which can be pulled outside and coiled inside a cable coiler and is applicable to be connected to a mobile phone and earphone. Therefore, such communication cable will have the problems of having too long or too many cables that may tangle together, or too short cables that do not fit the practical needs, and the present invention gives a more convenient way of using the mobile phone.

Another objective of the present invention is to provide an amplifier with coiled cable that uses an earphone to transmit the sound from the receiver of the mobile phone to the user's ear, or may also select to use the amplifying element to transmit the sound from the receiver of the mobile phone to the user's ear. It gives an alternative for the earphone, so that the user can make use of this amplifying function and does not need to attach the mobile phone to the ear or use the earphone in order to transmit the voice from the receiver of the mobile phone to the user's ear.

To attain the foregoing objectives, the present invention provides a portable device for coiling cable and amplifying sound comprising a cover body and an amplifier with coiled cable, and a fixing member is disposed on the outer side of the cover body. Such the amplifier with coiled cable comprises a casing, a cable coiling mechanism, a communication cable, an earphone, a circuit unit, and a connector, and the cable coiling mechanism, the communication cable, and the circuit unit are disposed inside the casing, and the communication cable is coiled around the cable coiling mechanism, and the earphone and circuit unit are connected to the communication cable, and the circuit unit has an amplifying element, and the connector connects the circuit unit by a connecting wire, and the amplifier with coiled cable is coupled to the cover body.

To make it easier for our examiner to understand the objective of the invention, structure, innovative features, and performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
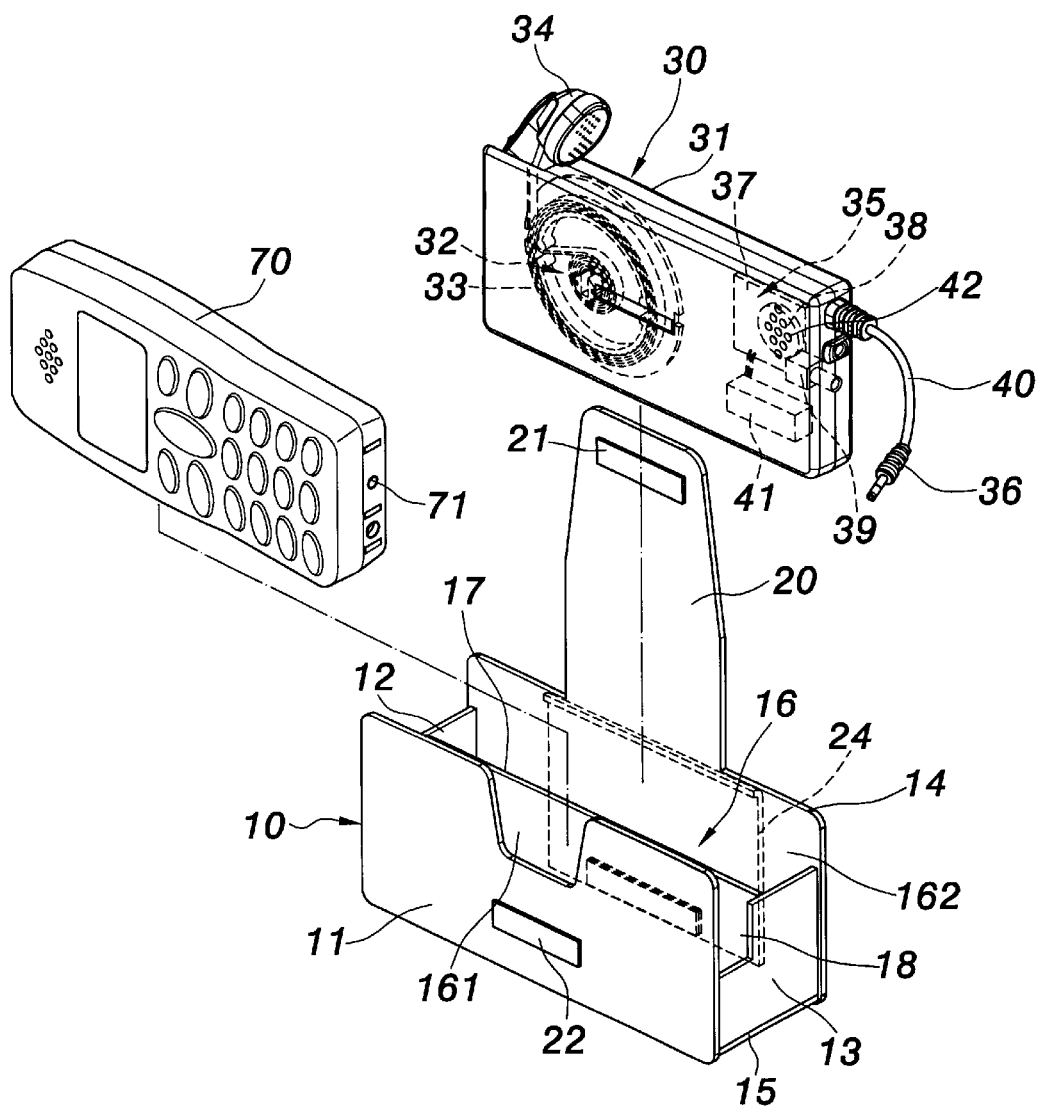
FIG. 1 is an exploded perspective view of a first preferred embodiment in accordance with the present invention.
Figure 2:
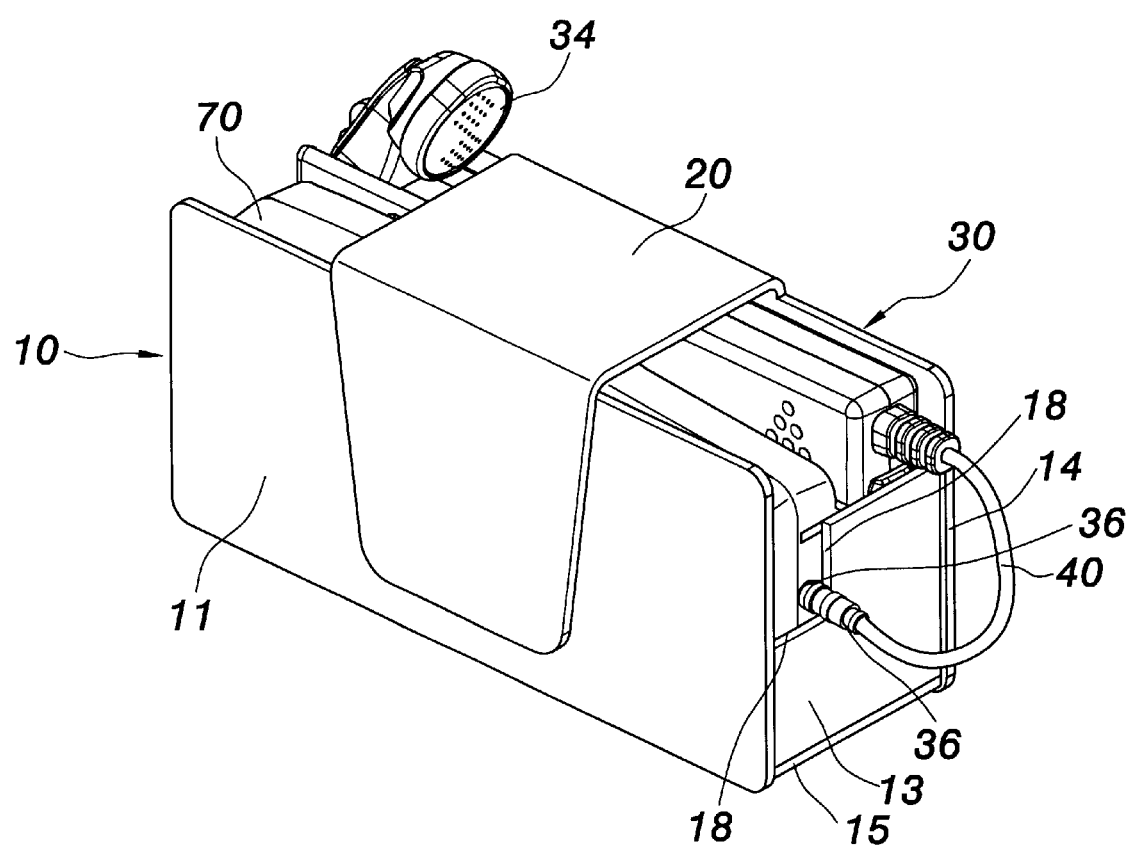
FIG. 2 is a perspective view of the first preferred embodiment in accordance with the present invention.
Figure 3:
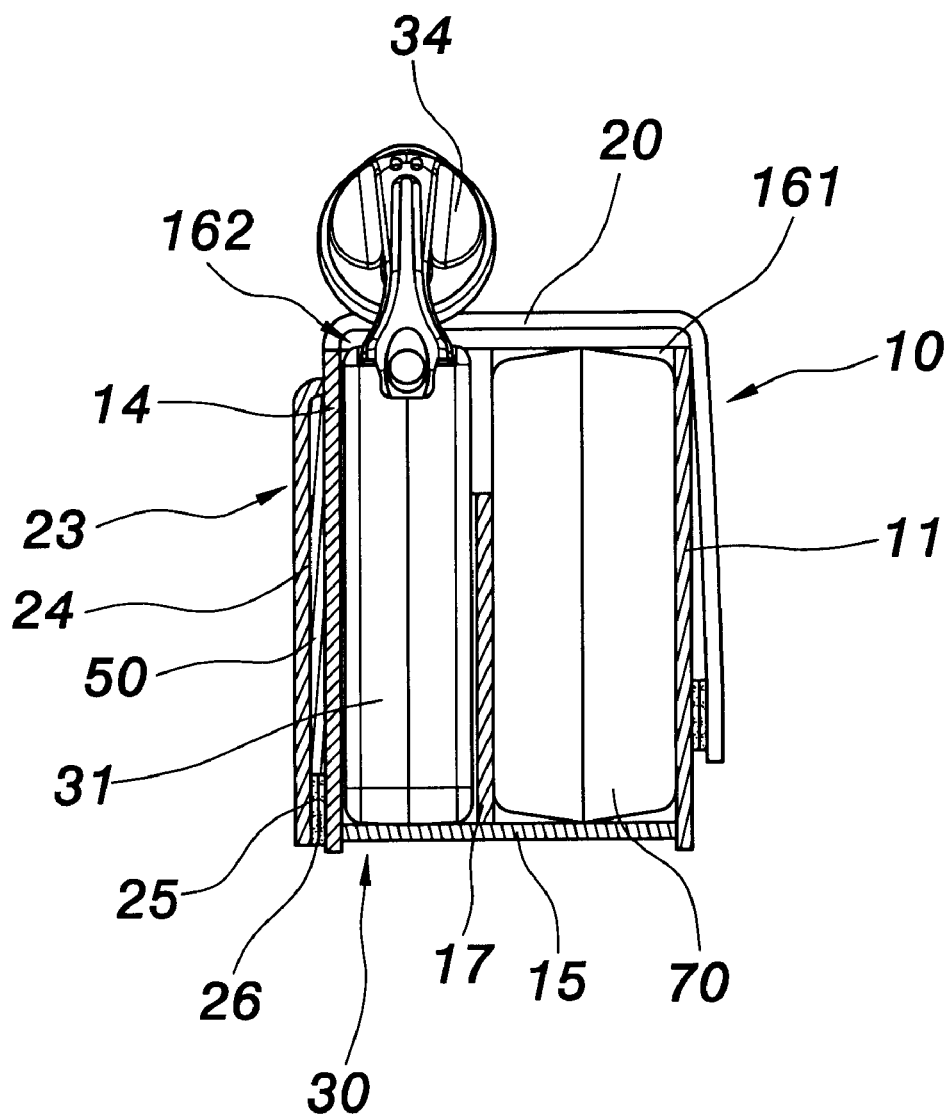
FIG. 3 is a side view of the first preferred embodiment in accordance with the present invention.
Figure 10:
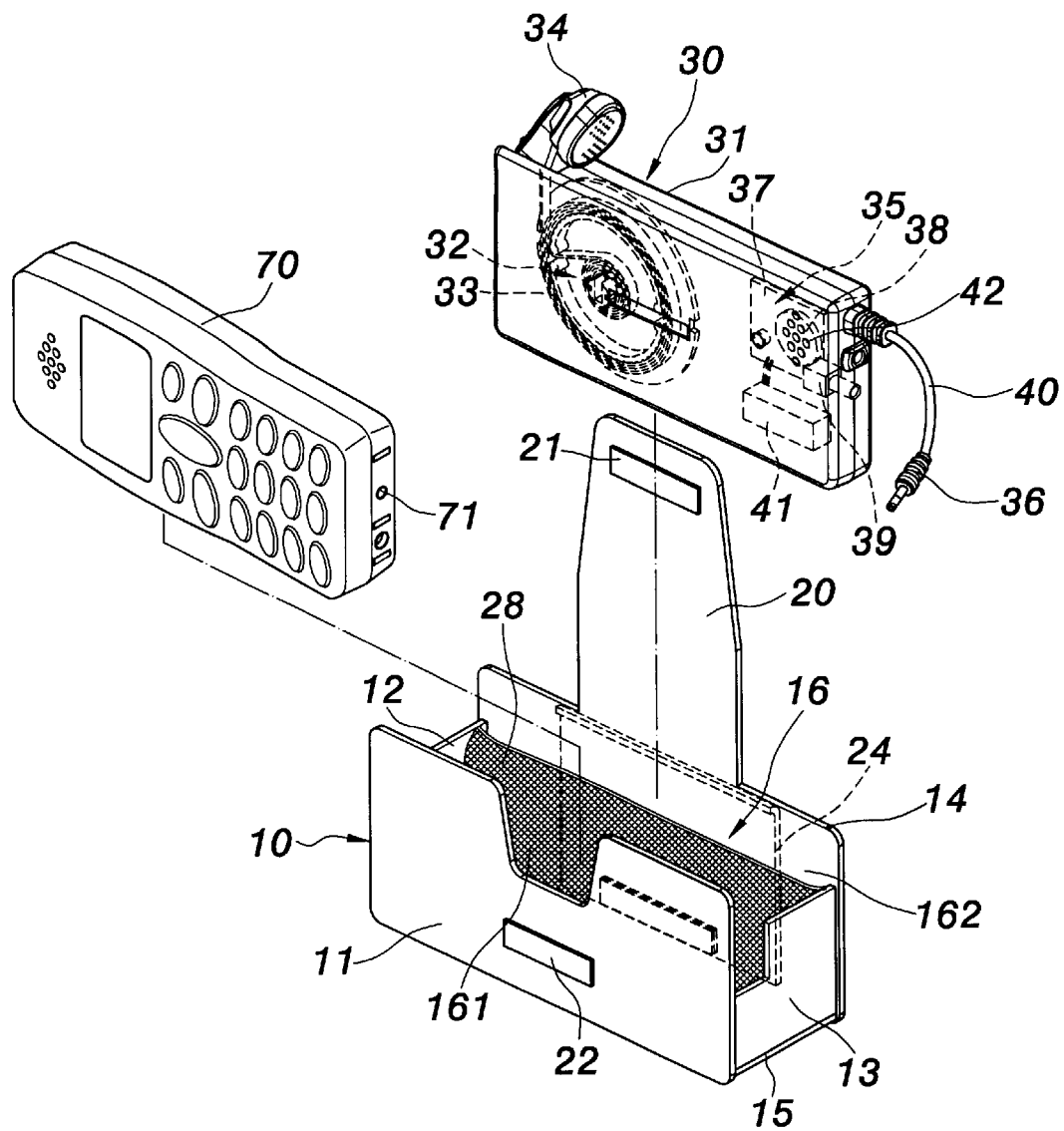
FIG. 10 is an exploded perspective view of a sixth preferred embodiment in accordance with the present invention.

Please refer to FIG. 1, FIG. 2, and FIG. 3. The present invention provides a portable device for coiling cable and amplifying sound, comprising a cover body 10, and an amplifier with coiled cable 30, wherein the cover body 10 is made of plastic or leather, and the cover body 10 is a container having an upward opening, and the cover body 10 comprising a front sidewall 11, a left sidewall 12, a right sidewall 13, a rear sidewall 14, and a bottom plate 15, and an appropriate distance between the front sidewall 11 and the rear sidewall 14, and an appropriate distance between the left sidewall 12 and the right sidewall 13. The left and right sides of the front sidewall 11 are coupled to the front end of the left sidewall 12 and the right sidewall 13; and the left and right sides of the rear sidewall 14 are coupled to the rear end of the left sidewall 12 and the right sidewall 13; the bottom plate 15 is coupled to the lower end of the front sidewall 11, left sidewall 12, the right sidewall 13, ad the rear sidewall 14. The front sidewall 11, the left and right sidewalls 12, 13, and the rear sidewall 14 enclose an accommodating space 16 in the interior of the cover body 10, and the accommodating space 16 has an isolating device 17 or elastic stripe 28 (as shown in FIG. 10). The left and right sides of the isolating device 17 are coupled between the left sidewall 12 and the right sidewall 13. The isolating device 17 partitions the accommodating space 16 into a first space 161 in the front and a second space 162 at the back, and a through hole 18 is disposed on the right sidewall 13. The elastic stripe 28 can securely hold the amplifier with coiled cable 30.

The upper end of the rear sidewall 14 of the cover body 10 is coupled to a lid 20, and the inner side of the lid and the outer side of the front sidewall 11 of the cover body 10 has corresponding latch pieces 21, 22 that can latch to each other. The latch pieces 21 and 22 for the embodiment of the present invention are the coupling stripe, and ordinary latches can also be used for this purpose so that the lid 20 can be securely fixed to the opening at the upper end of the cover body 10.

Figure 5:
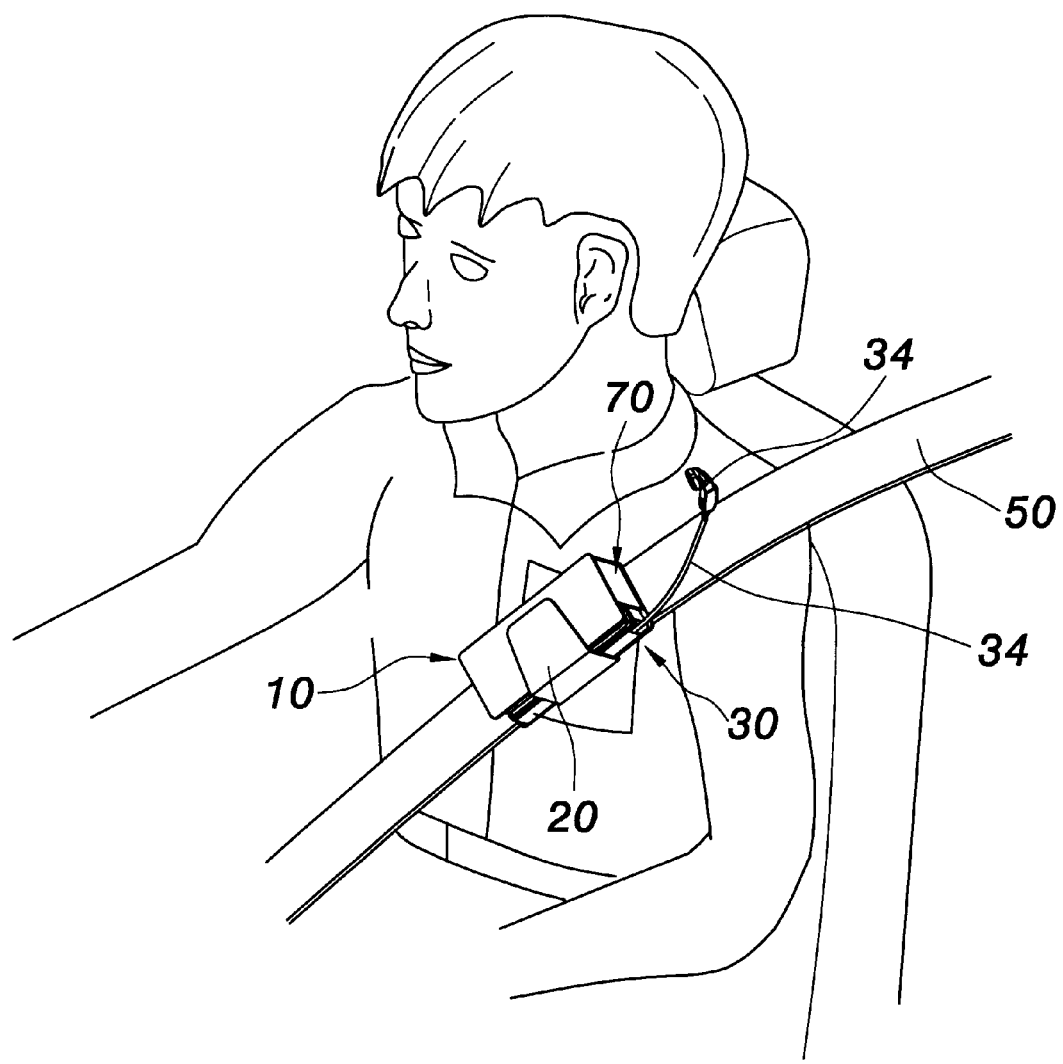
FIG. 5 is a schematic view of the first preferred embodiment in accordance with the present invention when it is in use.
Figure 6:
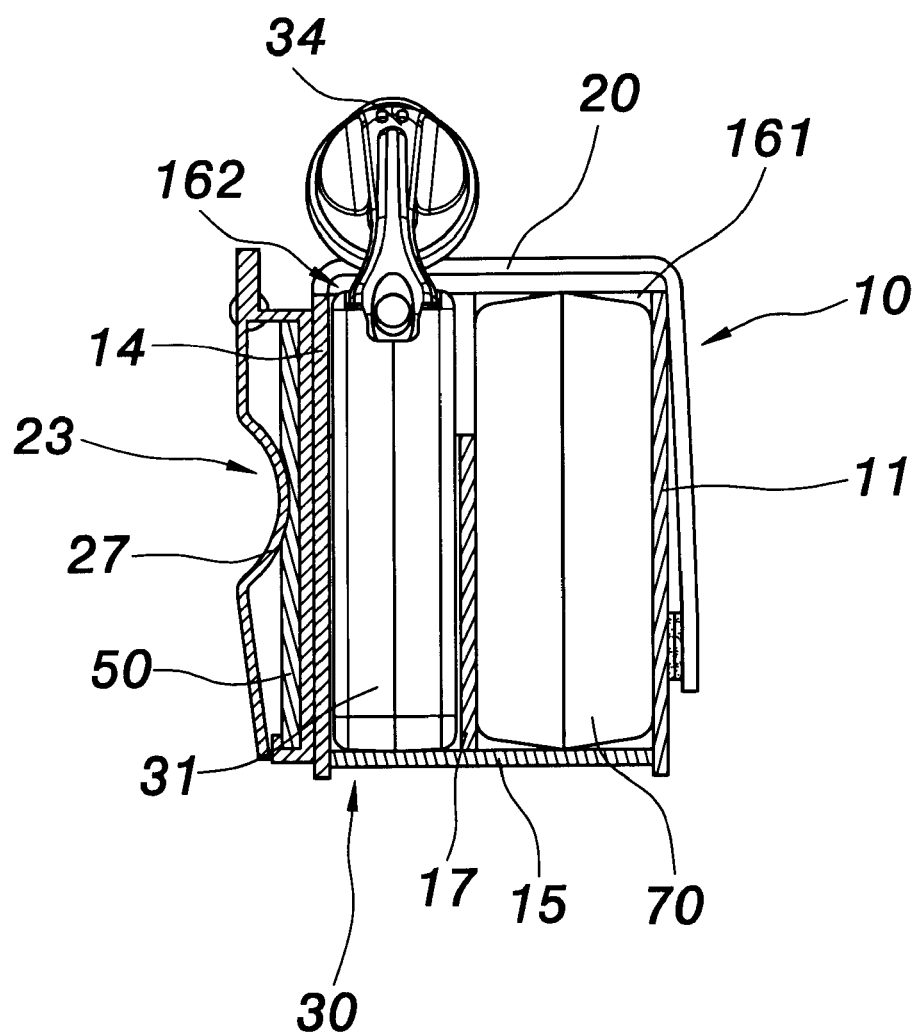
FIG. 6 is a side view of the second preferred embodiment in accordance with the present invention.

A fixing member 23 is disposed at the outer side of the rear sidewall 14 of the cover body 10, and the fixing member 23 for the embodiment of the present invention is a fixing plate 24, and the upper end of the fixing plate 24 is coupled to the rear sidewall 14 such that the lower end of the fixing plate 24 becomes a free end. The inner side of the fixing plate 24 and the outer side of the rear sidewall 14 of the cover body 10 has corresponding latch pieces 25, 26 that they can latch to each other. The latch pieces 25 and 26 for the embodiment of the present invention are the coupling stripe, and of course it is not restricted to coupling stripe only, but ordinary latches can also be used for this purpose so that the fixing plate 24 can be secured to the safety belt 50 (as shown in FIG. 3 and FIG. 5) or the regular belt. Please also refer to FIG. 6, the fixing member 23 can be an elastic clip 27, and the elastic clip 27 can be elastically secured to the safety belt 50 or regular belt.

The amplifier with coiled cable 30 comprises a casing 31, a cable coiling mechanism 32, a communication cable 33, an earphone 34, a circuit unit 35, a connector 36, and a microphone (not shown in the figure), and the casing 31 is a hollow casing, the cable coiling mechanism 32, the communication cable 33, and the circuit unit 35 are disposed in the interior of the casing 31, and the cable coiling mechanism 32 is the same as the traditional cable coiling mechanism which comprises a rotary disk and a spiral spring (not shown in the figure). Since it is the prior-art technology and not the claimed range of the present patent application, therefore it is not described here.

Figure 4:
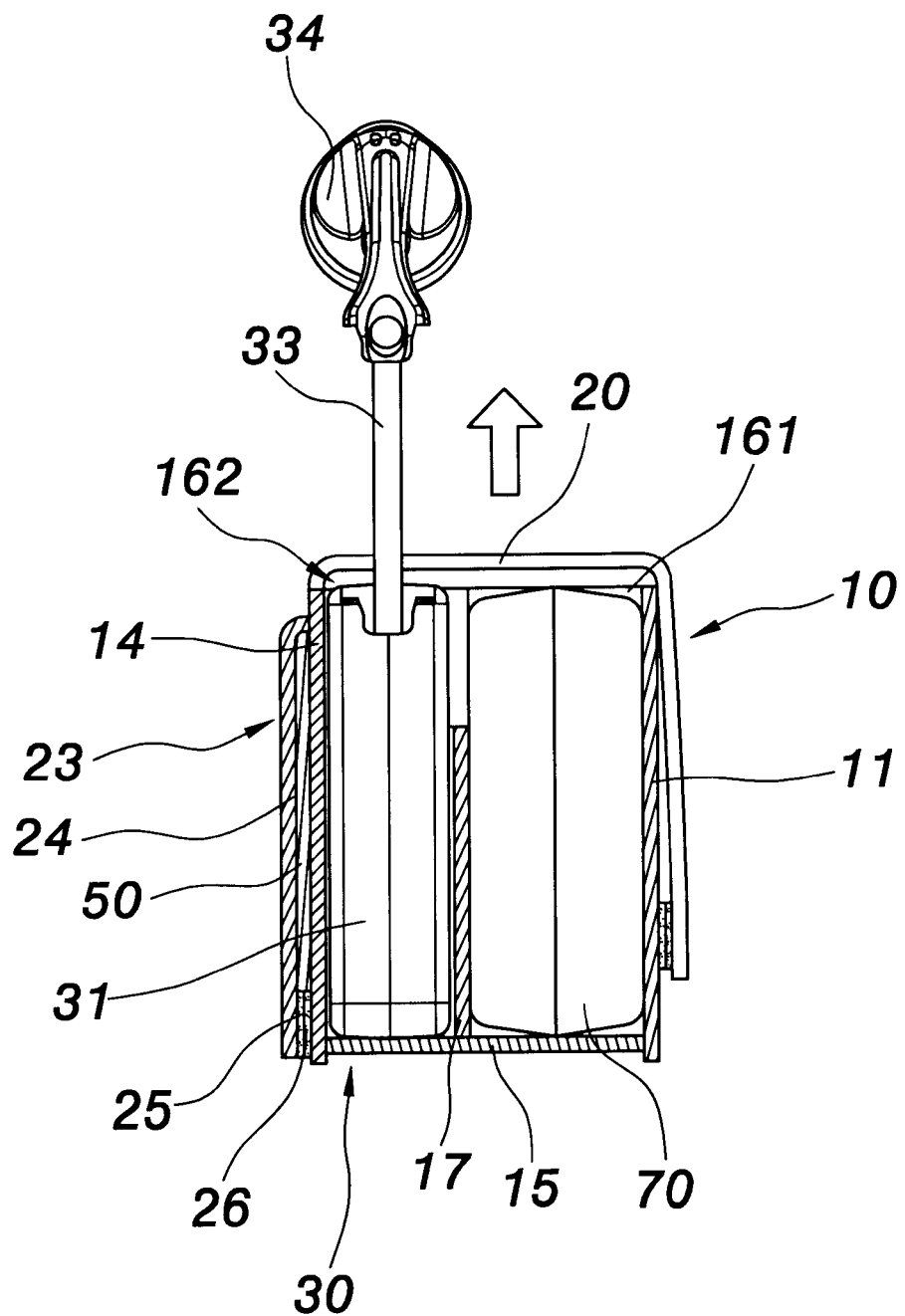
FIG. 4 is a schematic view of the first preferred embodiment in accordance with the present invention when the earphone is pulled out.

The communication cable 33 is coiled around the cable coiling mechanism 32, and the earphone 34 and the circuit unit 35 are coupled to both ends of the communication cable 33. The earphone 34 is disposed on the exterior of the casing 31, and in the actual practice, the cable coiling mechanism 32 is used to coil and accommodate the communication cable 33 of specific length. The communication cable 33 and the earphone 34 can be pulled out from the cable coiling mechanism 32 (as shown in FIG. 4), and the communication cable 33 keeps the tension due to the action by the spiral spring so that the communication cable 33 can be successfully coiled back into the casing 31. Therefore it will not cause problems of having too long communication cable 33 that they tangle with each other or too short that do not fit the practical needs.

The circuit unit 35 comprises a circuit board 37, an amplifying element 38, and a recharge socket 39, wherein the amplifying element 38 and the recharge socket 39 are disposed on the circuit board 37, and the amplifying element 38 is a loudspeaker. A sound hole 42 corresponsive to the amplifying element 38 is disposed on the casing 31 to facilitate the sound transmission to the exterior of the casing 31. The connector 36 is coupled to the circuit board 37 via a connecting wire 40, and the circuit board 37 can connect to a battery 41 such that it has the charge accumulation function of a battery, and the circuit board 37 can also have the radio circuit so that it has the radio function. The amplifier with coiled cable 30 is accommodated in the second space 162 of the cover body 10 such that the amplifier with coiled cable 30 is coupled to the cover body 10. The foregoing structure assembly forms the portable earphone with coiled cable and microphone amplification.

In the actual practice, the mobile phone 70 can be accommodated in the first space 161 of the cover body 10, and the connector 36 is connected to the signal output socket 71 via the through hole 18 such that the mobile phone 70 is electrically coupled to the portable device for coiling cable and amplifying sound of the present invention, and cover the lid 20 onto the opening at the upper end of the cover body 10. The latch pieces 21, 22 are latched with each other, so that the lid 20 is secured to the opening at the upper end of the cover body 10 to prevent the mobile phone 70 and the amplifier with coiled cable 30 from being fallen out from the first space 161 and the second space 162.

Please refer to FIG. 3, FIG. 4, and FIG. 5. The present invention uses the fixing member 23 at the outer side of the cover body 10 to fix the amplifier to the safety belt 50 and the regular belt to facilitate the portability. The communication cable 33 and the earphone 34 can be pulled out from the cable coiling mechanism 32 so that the earphone 34 of the amplifier with coiled cable 30 is used to transmit the voice from a receiver unit (not shown in the figure) of the mobile phone 70 to the user's ear. Since the amplifier with coiled cable 30 of the present invention has an amplifying element 38 that can also transmit the sound from the receiver to the user's ear. It provides users another alternative other than the earphone 34 to have the amplification function, such that the user does not need to attach the ear to the mobile phone 70 or uses the earphone to transmit the voice from the receiver 70 of the mobile phone 70 to the user's ear.

Furthermore, the present invention provides a communication cable 33 that is applicable for the connection to a mobile phone 70 and an earphone 34 that can be pulled outside and coiled inside the cable coiler. Therefore, the communication cable 33 will not have the problems of having too long or too many cables that may tangle with each other, or too short that does not fit the practical needs. It gives a more convenient way of using the mobile phone.

Figure 7:
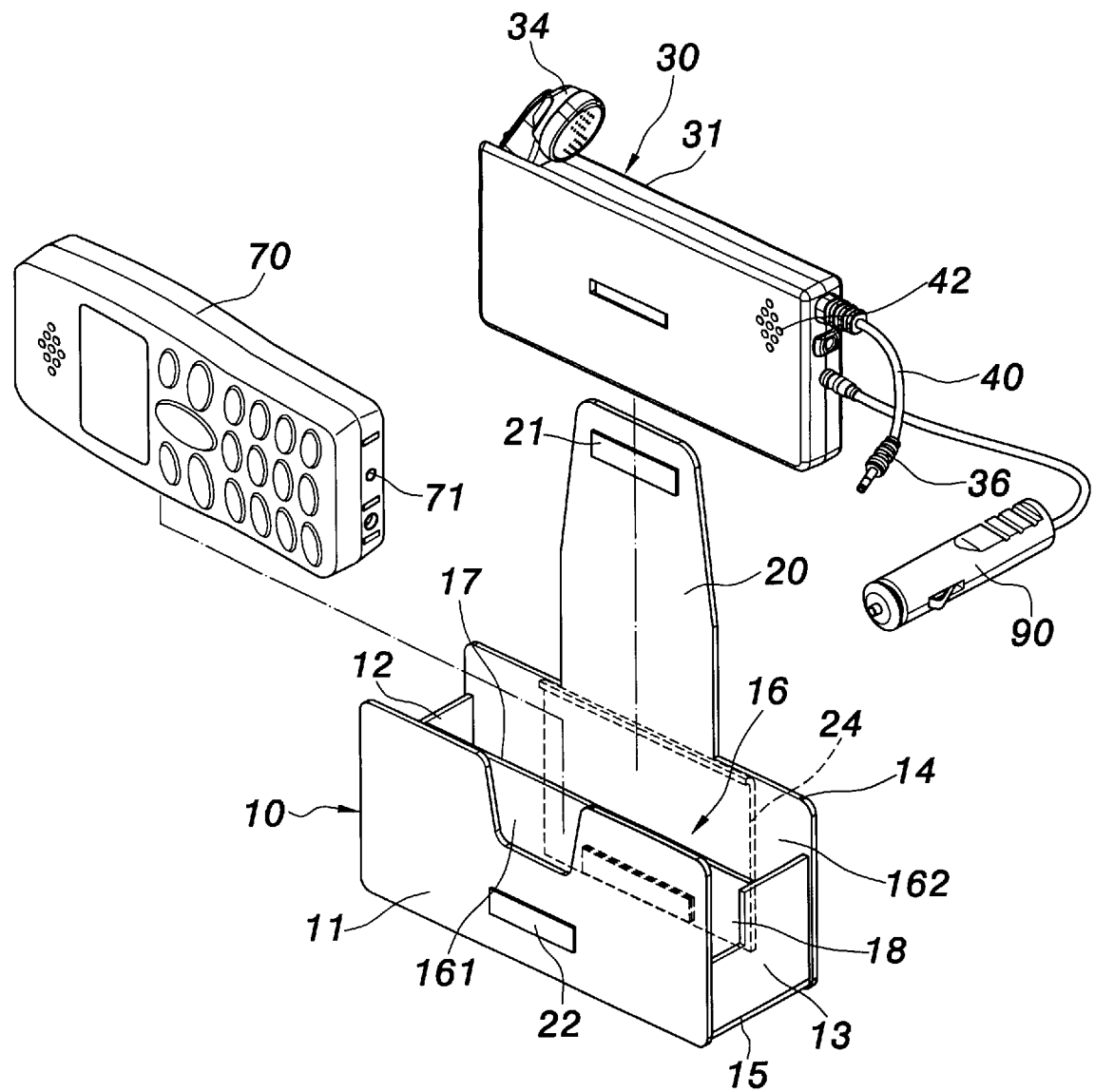
FIG. 7 is an exploded perspective view of a third preferred embodiment in accordance with the present invention.
Figure 8:
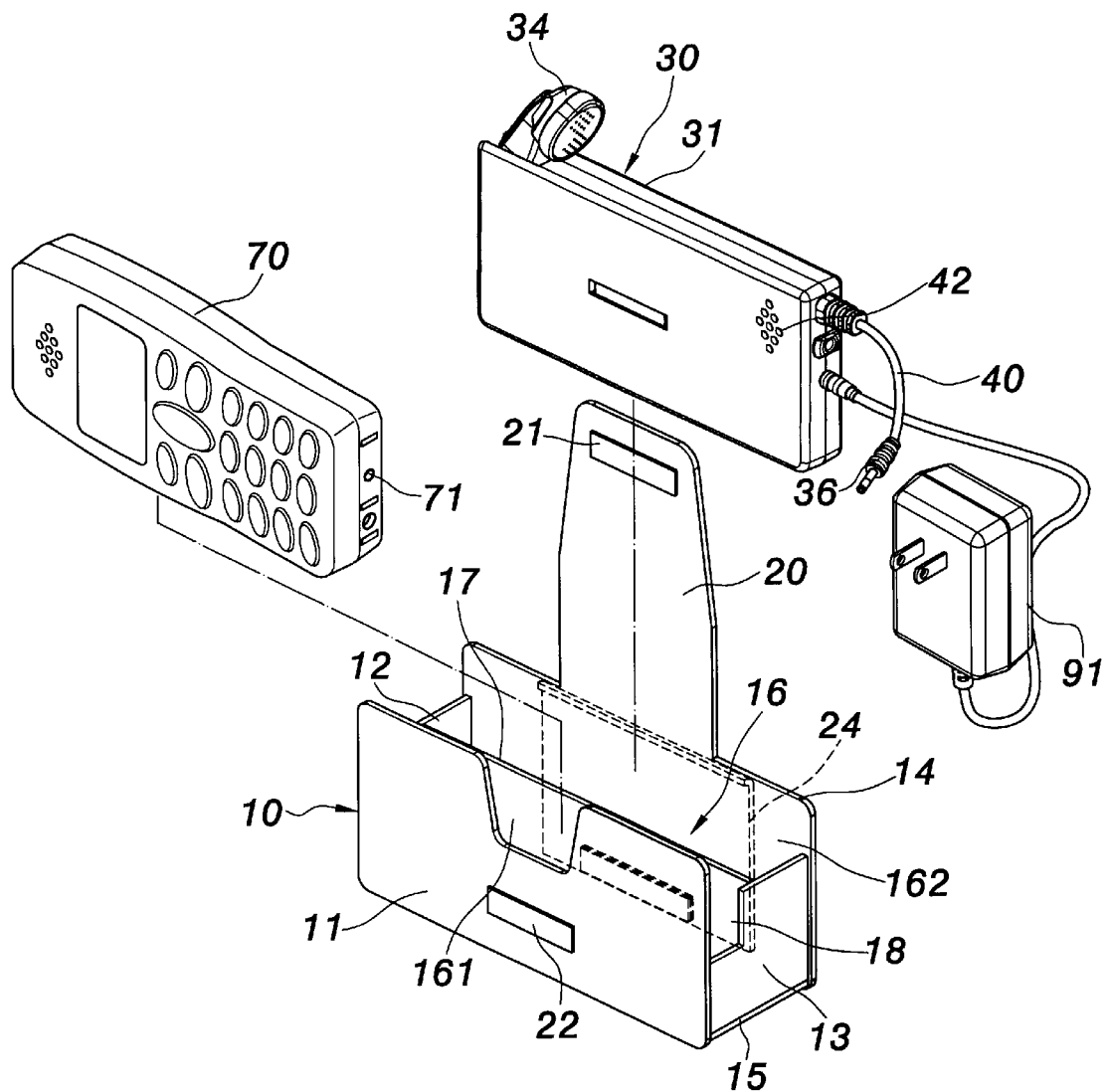
FIG. 8 is an exploded perspective view of a fourth preferred embodiment in accordance with the present invention.

Please refer to FIG. 7 and FIG. 8. The amplifier with coiled cable 30 of the present invention further comprises a recharge socket 39 (as shown in FIG. 1) for connecting to regular connectors 90, 91 to facilitate the connection to the cigarette lighter in the motor vehicle or the electric socket for the electrical recharge to the amplifying device with coiled cable 30. The electric power is stored into the battery 41, or the battery can be put outside for easy replacement, or switched to ordinary battery.

Figure 9:
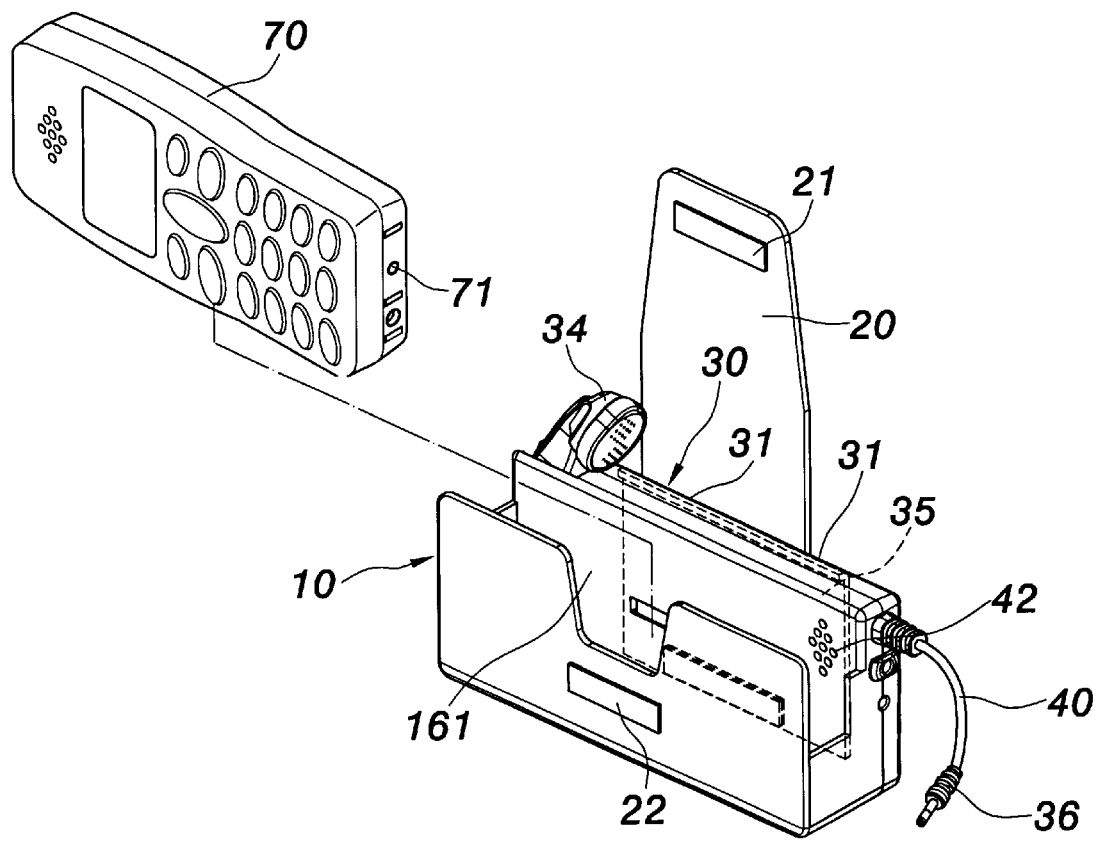
FIG. 9 is an exploded perspective view of a fifth preferred embodiment in accordance with the present invention.

Please refer to FIG. 9. The amplifier with coiled cable 3030 of the present invention may incorporate a design of integral formation with the cover body 10, i.e. integrating the cover body 10 and the casing 31 of the amplifier with coiled cable 30 as one piece such that the amplifier with coiled cable 30 is coupled to the cover body 10, and the cover body 10 has a first space 161 in its interior and the mobile phone 70 can be disposed inside the first space 161 of the cover body 10.

In summation of the above description, the present invention herein enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable device for coiling cable and amplifying sound, comprising: a cover body having a outer side disposed with a fixing member; and an amplifier with a coiled cable, including a casing, a cable coiling mechanism, a communication cable, an earphone, a circuit unit and a connector; the cable coiling mechanism, the communication cable and the circuit unit correspondingly arranged in an inner portion of the casing, the communication cable coiled around the cable coiling mechanism; the earphone and the circuit unit respectively coupled to two ends of the communication cable; the circuit unit having an amplifying element, and the connector being connected to the circuit unit by a connecting wire; the amplifier with the coiled cable being coupled to the cover body.

2. A portable device for coiling cable and amplifying sound as claimed in claim 1, wherein said cover body has an inner portion arranged with a first space and a second space, and the amplifier with the coiled cable being accommodated in the second space.

3. A portable device for coiling cable and amplifying sound as claimed in claim 2, wherein said cove body has a front sidewall, a left sidewall, a right sidewall, a rear sidewall, and a bottom plate being enclosed to form an accommodating space therein, and an isolating element or an elastic stripe disposed in the accommodating space for partitioning the accommodating space into the first space and the second space.

4. A portable device for coiling cable and amplifying sound as claimed in claim 1, wherein said cover body is integrally formed with the amplifier with the coiled cable.

5. A portable device for coiling cable and amplifying sound as claimed in claim 1, wherein said cover body has a first space therein.

6. A portable device for coiling cable and amplifying sound cable as claimed in claim 1, wherein said cover has a through hole thereon.

7. A portable device for coiling cable and amplifying sound as claimed in claim 1, wherein said cover body is coupled to a lid, and the lid and the cover body respectively having corresponding latch pieces for latching together.

8. A portable device for coiling cable and amplifying sound as claimed in claim 1, wherein said fixing member is a fixing plate coupled to the cover body, and the fixing plate and the cover body respectively having corresponding latch pieces for latching together.

9. A portable device for coiling cable and amplifying sound as claimed in claim 1, wherein said fixing member is an elastic clip.

10. A portable device for coiling cable and amplifying sound as claimed in claim 1, wherein said circuit unit includes a circuit board and a recharge socket, and the amplifying element and the recharge socket respectively disposed on the circuit board.

11. A portable device for coiling cable and amplifying sound as claimed in claim 1, wherein said casing has sound holes corresponding to the amplifying element.

12. A portable device for coiling cable and amplifying sound as claimed in claim 1, wherein said circuit unit are coupled to a battery.

13. A portable device for coiling cable and amplifying sound as claimed in claim 1, wherein said circuit unit has a radio circuit.

14. A portable coiled cable amplifier as claimed in claim 1, wherein said amplifying element of the circuit unit is a loudspeaker.

* * * * *